(12) United States Patent
Tanaka

(10) Patent No.: US 8,976,248 B2
(45) Date of Patent: Mar. 10, 2015

(54) MONITORING SYSTEM

(75) Inventor: Masahide Tanaka, Osaka (JP)

(73) Assignee: NL Giken Incorporated, Osaka (JP)

( * ) Notice: Subject to any disclaimer, the term of this patent is extended or adjusted under 35 U.S.C. 154(b) by 392 days.

(21) Appl. No.: 12/848,120

(22) Filed: Jul. 31, 2010

(65) Prior Publication Data

US 2011/0025852 A1 Feb. 3, 2011

(30) Foreign Application Priority Data

Aug. 3, 2009 (JP) ................................. 2009-181129

(51) Int. Cl.
| | |
|---|---|
| H04N 7/18 | (2006.01) |
| H04N 5/335 | (2011.01) |
| H04N 5/225 | (2006.01) |
| H04L 12/54 | (2013.01) |
| H04L 29/06 | (2006.01) |
| G07C 9/00 | (2006.01) |

(52) U.S. Cl.
CPC ............ H04N 7/186 (2013.01); H04L 12/5692 (2013.01); H04L 29/06836 (2013.01); G07C 9/00071 (2013.01)
USPC ........... 348/156; 348/143; 348/308; 348/311; 348/375; 348/14.06

(58) Field of Classification Search
CPC ..................... H04L 29/06836; H04L 12/5692; H04N 21/2396; H04N 21/2187; H04N 21/235; H04N 21/4882; H04N 1/212; H04N 1/2112; H04N 1/19594; H04N 5/232; H04N 5/765; H04N 5/772; H04N 5/2319; H04N 7/142; H04N 7/183; H04N 7/188

USPC ........... 348/14.02, 14.06, 143, 156, 308, 311, 348/375
See application file for complete search history.

(56) References Cited

U.S. PATENT DOCUMENTS

| | | | | |
|---|---|---|---|---|
| 4,688,105 | A * | 8/1987 | Bloch et al. .................... | 386/224 |
| 6,504,470 | B2 * | 1/2003 | Puchek et al. ................ | 340/5.53 |
| 7,123,126 | B2 * | 10/2006 | Tanaka et al. .................. | 340/5.2 |
| 8,154,581 | B2 * | 4/2012 | Carter ......................... | 348/14.06 |
| 2003/0081746 | A1 * | 5/2003 | Ahlstrom et al. ......... | 379/102.06 |

(Continued)

FOREIGN PATENT DOCUMENTS

| | | |
|---|---|---|
| JP | 2006120086 A | 5/2006 |
| JP | 2008-79105 A | 4/2008 |

(Continued)

*Primary Examiner* — Emmanuel L Moise
*Assistant Examiner* — Farzana Huq

(57) ABSTRACT

Monitoring system of person coming to entrance comprises camera for capturing image of the person and recorder for the captured image, the system informing the person of the image recordation for deterring a crime in bad visit case or making polite notice in goodwill visit case. Unlock system has an intercom for visitor to request unlock and a self unlock operating portion for resident. If unlock done through intercom with acquaintance confirmed, polite notice is preferred, whereas "note record" is added to the image record in case of intercom unlock with unacquainted assumed. If unlock done by resident, the information and the image recordation are withheld. If entrance in a group detected, "note record" is added to the image record in case bad person successively follows goodwill person duly unlocking entrance. Privacy of acquaintance visitor image is protected by password. "Note record" is added to image record without voice message.

12 Claims, 7 Drawing Sheets

(56) References Cited

U.S. PATENT DOCUMENTS

| | | | |
|---|---|---|---|
| 2005/0253684 A1* | 11/2005 | Kumazaki et al. | 340/5.62 |
| 2006/0041542 A1* | 2/2006 | Hull et al. | 707/3 |
| 2006/0103762 A1* | 5/2006 | Ly et al. | 348/584 |
| 2006/0126906 A1* | 6/2006 | Sato et al. | 382/118 |
| 2008/0303903 A1* | 12/2008 | Bentley et al. | 348/143 |
| 2009/0231441 A1* | 9/2009 | Walker et al. | 348/207.1 |
| 2010/0194566 A1* | 8/2010 | Monden | 340/568.1 |
| 2010/0195810 A1* | 8/2010 | Mota et al. | 379/167.12 |
| 2011/0128414 A1* | 6/2011 | Walker et al. | 348/231.99 |

FOREIGN PATENT DOCUMENTS

| | | |
|---|---|---|
| JP | 2008078033 A | 7/2008 |
| JP | 2008226103 A | 9/2008 |

\* cited by examiner

MONITORING SYSTEM

BACKGROUND OF THE INVENTION

1. Field of the Invention

This invention relates to a monitoring system of a person coming to an entrance of a building.

2. Description of the Related Art

In this field of the art, various attempts have been done with respect to a monitoring system of a person coming to an entrance of a building with the security taken into consideration.

For example, Japanese Publication No. 2008-79105 proposes an intercom system for a collective housing including a communal entrance unit having a camera for capturing a visitor and home units each located in each home, respectively, in communication with the communal entrance unit, in which the image captured by the camera is recorded if a call number input at the communal entrance unit does not coincide with a reference call number or only a room number is input at the communal entrance unit.

However, there still exist in this field of art many demands for improvements of a monitoring system of a person coming to an entrance of a building.

SUMMARY OF THE INVENTION

Preferred embodiments of this invention provide a monitoring system of a person coming to an entrance of a building for effectively deterring a crime by the person in case of coming with bad intention.

Preferred embodiments of this invention provide a monitoring system of a person coming to an entrance of a building for avoiding impoliteness to the person in case of coming with goodwill.

Preferred embodiments of this invention provide a monitoring system of a person coming to an entrance of a building for avoiding a possible trouble with the person in advance.

Preferred embodiments of this invention provide a monitoring system of a person coming to an entrance of a building in which an inspection of the image captured and recorded though the system will be effectively carried out afterward.

Preferred embodiments of this invention provide a monitoring system of a person coming to an entrance of a building for protecting privacy of the person.

A preferred embodiment of this invention provides a monitoring system of a person coming to an entrance of a building comprising a camera arranged to capture an image of the person, a recorder arranged to record the image captured by the camera and an informer arranged to inform the person of the capture and the recoding of the image of the person. According to this feature, since the person coming to the entrance is informed of the fact that his/her image is recorded, the person is deterred from a crime or noticed in advance according to his intention.

In a detailed design according to the above preferred embodiment, the monitoring system further comprises an unlock system of the entrance, wherein the informer is arranged to be controlled by the unlock system to change the manner of information. Accordingly, the manner of information is suitably changed in accordance with the type of the person accessing the unlock system.

In more detail, the informer is arranged to withhold the information with the unlock system identifying the person as a resident in the building whereas the informer carries out the information with the unlock system identifying the person as a visitor. Thus, redundant information to a resident familiar to the monitoring system is skipped whereas the information is carried out to a visitor on the safe side.

According to another more detailed feature, the informer is arranged to change the contents of information depending on whether the unlock system identifying the person as an acquaintance visitor or an unacquainted visitor. In more detail, the unlock system includes an intercom arranged to receive an unlock direction from inside of the building in response to a call from the visitor, the unlock system identifying the person as the acquaintance visitor in response to the unlock direction accompanied with an acquaintance confirmation made inside the building. Thus, it is possible to make a deterrent manner of information as to unacquainted visitor, while a polite manner of information is to be made as to acquaintance visitor.

In another detailed design according to the above preferred embodiment, the monitoring system further comprises a detector arranged to detect a group of persons to enter the entrance, wherein the informer is arranged to be controlled by the detector to change the manner of information. In more detail, the informer is arranged to change the contents of information depending on whether or not the detector detects a group of persons. This feature is advantageous to make a timely deterrent against such a case that a bad person skipping an unlocking procedure successively follows a resident or goodwill visitor to enter the building during the entrance duly unlocked is kept open.

In still another detailed design according to the above preferred embodiment, the monitoring system further comprises an identifier arranged to identify the person, wherein the informer is arranged to repeat the information at deferent places in the building, the repetition being omitted with the identifier identifying the person as one of a resident and an acquaintance visitor. Thus, the repetition of deterrent information is suitably focused to unacquainted visitor.

According to another feature of the preferred embodiment of this invention, a monitoring system of a person coming to an entrance of a building comprises a camera arranged to capture an image of the person, a recorder arranged to record the image captured by the camera and an administrator arranged to add additional information to the image recoded by the recorder. This is advantageous to a later inspection of the recorded image.

In a detailed, design according to the above preferred embodiment, the monitoring system further comprises an unlock system of the entrance, wherein the administrator is arranged to be controlled by the unlock system to change the additional information to be added to the recorded image. Accordingly, the later inspection can be effectively practiced on the basis of the changed additional information.

In more detail the recorder above is arranged to withhold the recoding function with the unlock system identifying the person as a resident in the building whereas the recorder carries out the recording function with the unlock system identifying the person as a visitor. Thus, redundant image is omitted for facilitating the later inspection.

According to another more detailed feature, the administrator above is arranged to change the contents of the additional information depending on whether the unlock system identifying the person as an acquaintance visitor or an unacquainted visitor. In more detail, the unlock system includes an intercom arranged to receive an unlock direction from inside of the building in response to a call from the visitor, the unlock system identifying the person as the acquaintance visitor in response to the unlock direction accompanied with an acquaintance confirmation made inside the building. Thus, the later inspection may be effectively focused on the recoded imaged with the additional information relating to unacquainted visitors, for example.

In another detailed design according to the above preferred embodiment, the monitoring system further comprises a detector arranged to detect a group of persons to enter the entrance, wherein the administrator is arranged to be controlled by the detector to change the additional information to be added to the recorded image. In more detail, the administrator is arranged to change the contents of the additional information depending on whether or not the detector detects a group of persons. This feature is advantageous to facilitating the later inspection to focus on such a case that a bad person skipping an unlocking procedure successively follows a resident or goodwill visitor to enter the building during the entrance duly unlocked is kept open.

In another detailed design according to the above preferred embodiment, the recorder is arranged to change the accessibility to the recorded image in response to the additional information added by the administrator indicative of type of visitors relating to privacy protection level. Thus, the image of acquaintance visitor is prevented from being accessed by a person without permission.

In another detailed design according to the above preferred embodiment, the monitoring system further comprises a voice message system, wherein the administrator is arranged to be controlled by the voice massage system to change the additional information to be added to the recorded image depending on whether or not a voice message is left. A person of goodwill is generally expected to leave some voice message to avoid impoliteness of silence, while a visitor who has gone without a word is assumed be a person with bad intention such as a sneak thief coming to confirm absence from a target home in advance. Thus, according to the above detailed feature, the later inspection is effectively possible with the recorded image without voice message focused on.

According to still another feature of the preferred embodiment of this invention, a monitoring system of a person coming to an entrance of a building comprises a camera arranged to capture an image of the person, a recorder arranged to record the image captured by the camera and an unlock system of the entrance, wherein the recorder is arranged to withhold the recoding function with the unlock system identifying the person as a resident in the building whereas the recorder carries out the recording function with the unlock system identifying the person as a visitor. In more detail, the unlock system includes an intercom arranged to receive an unlock direction from inside of the building in response to a call from the visitor and a resident unlock operating portion, the unlock system identifying the person as the resident with the resident unlock operating portion duly operated whereas the unlock system identifying the person as a visitor with a call through the intercom made. Thus, redundant image recording is suitably omitted.

Other features, elements, arrangements, steps, characteristics and advantages according to this invention will be readily understood from the detailed description of the preferred embodiments in conjunction with the accompanying drawings.

The above description should not be deemed to limit the scope of this invention, which should be properly determined on the basis of the attached claims.

DETAILED DESCRIPTION OF THE PREFERRED EMBODIMENTS

Figure 1:
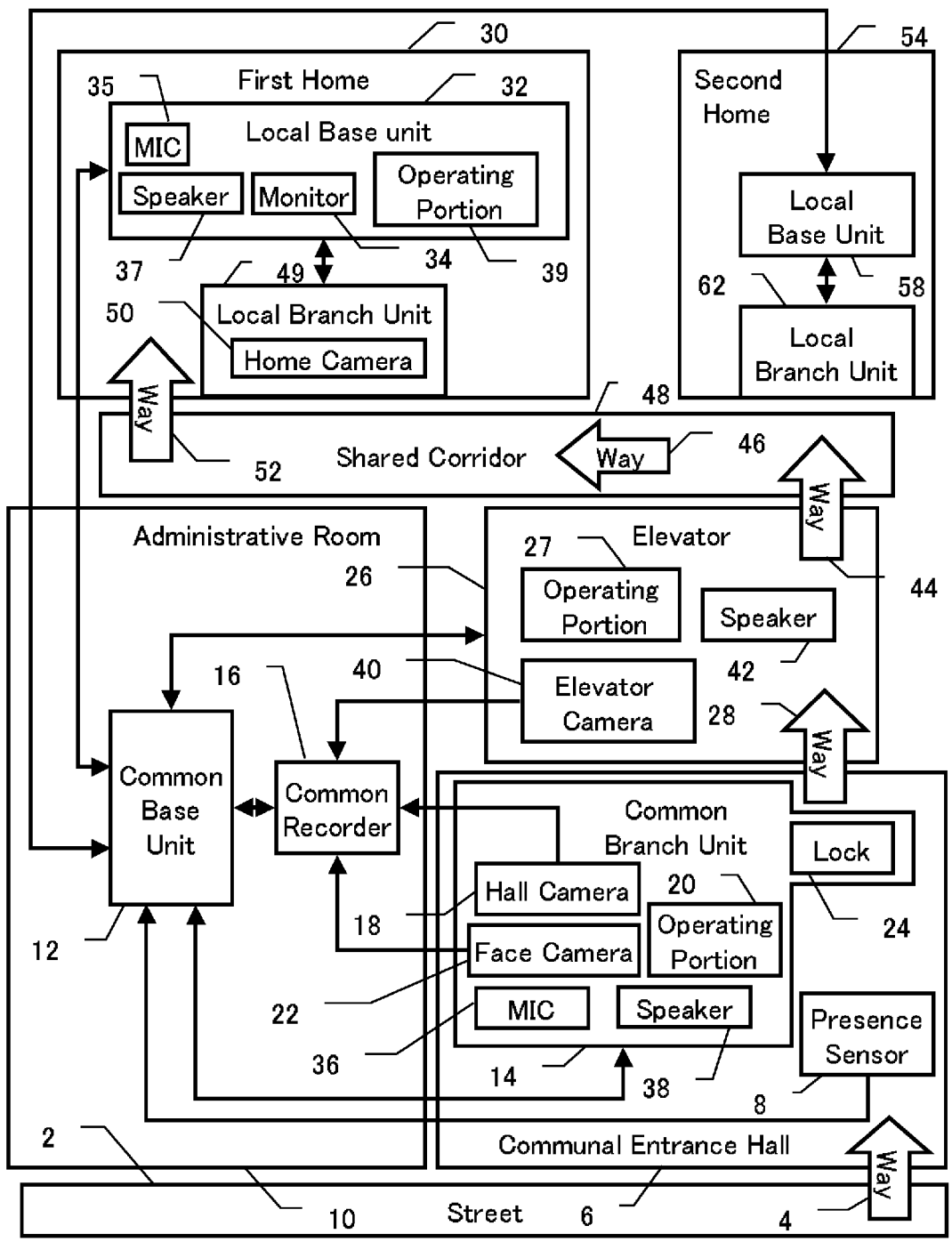
FIG. 1 is a block diagram showing the monitoring system according to an embodiment of this invention.

FIG. 1 is a block diagram showing the monitoring system according to an embodiment of this invention. The system is formed as an audio-visual common intercom system for a collective housing such as a condominium. A resident or a visitor arriving at the condominium along street 2 firstly enters into communal entrance hall 6 as indicated by way 4. Presence sensor 8 is arranged to automatically detect the resident or the visitor appearing at communal entrance hall 6 to send a detection signal to common base unit 12 of administrative room 10 of the condominium. In response to the detection signal, common base unit 12 directs common branch unit 14 and common recorder 16 to have hall camera 18 capture motion image of entire communal entrance hall 6 and to have common recorder 16 start to record the motion image from hall camera 18. Hall camera 18 is arranged to be capable of capturing the image of a person regardless of the location of the person in communal entrance hall 6. For this purpose, hall camera 18 may be a combination of a plurality of cameras each taking its chare of various angles to cover entire of communal entrance hall 6 in total.

The resident or the visitor operates operating portion 20 of common branch unit 14. In the case of the resident, the operation means an insertion of an unlock card, or an input of a password, or an biometrics authentication. If the resident is successfully identified by means of one or a combination of the above operations, common base unit 12 has common branch unit 6 instantly unlock electric lock 24 without activating face camera 22 to allow the identified resident passing through communal entrance hall 6 and get on elevator 26. Thus, the resident is capable of getting on elevator 26 by way 28 to set destination floor at operating portion 27.

On the other hand, in the case of the visitor, the operation at operation portion 20 in communal entrance hall 6 means an designation of room number at intercom buttons to call the home to visit. In response to the input of room number, common base unit 12 directs common branch unit 14 and common recorder 16 to have face camera 22 capture motion image of the face of the visitor in front of face camera 22 and to have common recorder 16 start to record the motion image from face camera 22. Face camera 22 also acts as intercom camera to inform the designated home of the face image of the visitor.

As has been briefly mentioned above, common base unit 12, in synchronism with the recording of the face image, sends the same image of face camera 22 along with the calling jingle to a local base unit of the home (e.g., local base unit 32 of first home 30) with the room number (e.g., "814") designated at operating portion 20 by the visitor. The sent face image from face camera 22 is displayed on monitor 34 of local base unit 32 or first home 30. In addition to the image, voice of visitor picked up by microphone 36 of common branch unit 14 is transmitted to speaker 37 of local base unit 32, while voice in first home 30 picked up by microphone 35 is transmitted to speaker 38 of common branch base unit 32, intercom conversation being thus possible between the visitor and a person in first home 30. Through the intercom conversation along with the face image, the person in first home 30 can operate local base unit 32 to send out unlock signal if the safety of the visitor is acceptable. In response to the unlock signal from local base unit 32, common base unit 12 has common branch unit 6 unlock electric lock 24 to allow the accepted visitor passing through communal entrance hall 6 and get on elevator 26. Further, common base unit 12 has elevator 26 allow operation of operating portion 27 to work. Thus, the visitor is capable of opening the door of elevator 26 to get on it by way 28 and setting destination floor at operating portion 27.

Upon operating local base unit 30 for sending the unlock signal, the person in first home 30 selects between two options of detailed operations in accordance with whether or not the visitor is an acquaintance. For this purpose, operating portion 39 of local base unit 32 includes two buttons for sending the unlock signal, one is in exclusive use for an acquaintance and the other in exclusive use for a stranger such as a deliveryman. Or operating portion 39 is arranged to have an auxiliary button in addition to a main unlock button, wherein the main button is to be pushed with the auxiliary button kept pushed in the case of an acquaintance, while the main button is to be simply pushed with the auxiliary button not pushed in the case of a stranger. In any case, the operation exclusive to an acquaintance causes a unlock signal accompanied by "acquaintance flag", which is sent to common base unit 12. Upon receipt of the unlock signal without the acquaintance flag, common base unit 12 has speaker 38 of common base branch 14 make an announcement such as "Please note your face has been just recorded. Thank you." Such an announcement acts as a deterrent to a direct crime against first home 30 by a fraud deliveryman or to an indirect crime by a criminal planning to firstly pass through communal entrance hall 6 and get on elevator 26 by means of cajoling the person of first home 30 to send the unlock signal and then to harm another person in other homes or an inside public space who has not known of the invasion of the criminal. The expression of the announcement is advisable to be brief and specific for the purpose of the most effective deterrent. On the other hand, the expression is advisable to be permissible by a goodwill deliveryman or the like who understands the needs of security at the communal entrance hall and expects the possibility of encountering some caution announce or the like upon visiting a customer.

Upon receipt of the unlock signal with the acquaintance flag accompanying, common base unit 12 has speaker 38 of common base branch 14 make a notice announcement such as "Please note that faces of all visitors to this condominium are recorded upon every intercom conversation for the purpose of keeping safety of visitors and residents. Your consideration has bee greatly appreciated." This is for avoiding trouble with a visitor in advance who would be offended if he/she comes to know afterward of the face recording without notice. Thus, the expression in this case should not be flavored with any caution against some illegal action, but a polite notice relying on forgiving spirit. The presence or absence of the acquaintance flag is recorded as an attachment to each recorded face image, which is advantageous in searching into face images afterward for examination of evidence in case of a crime for example since the face images can be easily classified into two groups with or without acquaintance flag in accordance with the purpose of the examination. The face image f the visitor in the case of acquaintance, which has been recorded in common recorder 16, is of high privacy of the visitor himself/herself and also of accepting home. Accordingly, the face images recorded in common recorder 16 each with acquaintance flag are kept in such a security condition that anyone cannot access the face image unless authorized by a person relating to the visit of the acquaintance to first home 30 according to a predetermined procedure.

As has been mentioned above, face camera 22 does not record face of a resident, but records that of a visitor only. On the contrary, hall camera 18 makes a record of image in communal entrance hall 6 in response to presence sensor 8 detecting someone regardless of a resident or a visitor, all the image from hall camera 18 being recorded in common recorder 16. This is to inspect such a possible illegal case that a person skipping the intercom conversation with bad intent will successively follow a resident or goodwill visitor to pass through communal entrance hall 6 with electric lock 14 once duly unlocked. For this purpose, the image captured by hall camera 18 is processed to extract person(s) from the image of entire communal entrance hall 6 and to count the number of person(s). And a note record is added to the hall image record if a group of persons, the number of which is greater than the number of persons who actually execute the unlock operation, successively passes through communal entrance hall 6. Such addition of note record is effective to search the illegal case image in case of a crime and to easily identify each person existing in the image of communal entrance hall 6. The above case is frequently expected since it is natural that a representative of a resident family group or a group of visitors may execute the unlock operation and the other persons will follow the representative without the unlock operation. It is difficult to distinguish the above goodwill case from a criminal case. Thus, common base unit 12 is arranged to have hall camera 18 and common recorder 16 to record all case with the note record on the safe side. By the way, the detection of the group to pass through communal entrance hall 6 may possible not only processing the image captured by hall camera 18, but also the output of presence sensor 8 may be utilizable by itself or in combination with the processing of image captured by hall camera 22.

Elevator camera 40, as in the case of hall camera 18, is arranged to be capable of capturing the image of a person regardless of the location of the person in elevator 26. For this purpose, elevator camera 40 may be a combination of a plurality of cameras each taking its chare of various angles to cover entire of elevator 26 in total. Elevator camera 40, as in the case of hall camera 18, makes a record of image of all people in elevator 26 regardless of a resident or a visitor, all the image from elevator camera 40 being recorded in common recorder 16. If elevator 26 departs from the floor of entrance hall 6 with a plurality of persons detected or at least one person without the acquaintance flag contained, speaker 42 makes an announcement such as "Please note that all images in this elevator are recorded. Thank you." Such an announcement serves as a repetition of the caution to a fraud visitor passing through communal entrance hall 6 by own unlock procedure causing no acquaintance flag, or as a first caution to a person with bad intention passing through communal entrance hall 6 by means of having someone unlock electric lock 24 to successively follow. The caution in elevator 26 is expected to be acceptable by a first visitor of goodwill or by a person of goodwill riding with stranger(s) on same elevator 40. On the other hand, in the case of elevator 40 departing from a floor other than the communal entrance hall floor, or in the case of elevator 40 departing form the communal entrance hall floor with a resident alone or a visitor causing the acquaintance flag alone therein, the announce in omitted for avoiding unnecessary botheration.

As shown by way 44, a person getting off elevator 26 at the destination floor, comes to the destination home such as first home 30 by way of shared corridor 48 as shown in way 46. A visitor in front of the door of first hoe 30 can operate local branch unit 49 including outside intercom call button or the like. In response to the operation of local branch unit 49, home camera 50 captures the face of the visitor, which is displayed on monitor 34 of local base unit 32. Thus, a person in first home 30, as a result of the face check on monitor 34 and intercom conversation through microphone 35 and speaker 37, can transmit an unlock signal from local base unit 32 to local branch unit 49 to unlock first home 30 for inviting the visitor into first home 30 as shown in way 52. The face image captured by home camera 50 can be stored in common recorder 16 under the control of base unit 32.

As has been mentioned above, the system according to this invention is formed as an audio-visual common intercom system for a collective housing such as a condominium. In FIG. 8, however, only second home 54 is shown for indicating the relationship between a plurality of homes and communal entrance hall in the simplest model. However, actual collective housing such as a condominium includes many homes, which can be understood through the simplest model in FIG. 2. Second home 54 includes local base unit 58 connected with common base unit 12 and local branch unit 62 connected with local base unit 58, the inside detailed structures of which are omitted in FIG. 1 since they are just the same as those in local base unit 32 and local branch unit 49 of first home 30. Any further detailed explanation of second home 54 is omitted. In summary, however, many homes such as second home 54 in the collective housing each cooperate with communal entrance hall 6, administrative room 10, and elevator 26 in the same manner as in the case of first home 30. And, the caution announcement system in combination with the camera image recording system against a person with bad intention which may be introduced through unlock operation from any one of the many homes is working in the same manner as explained with respect to first home 30.

Figure 2:
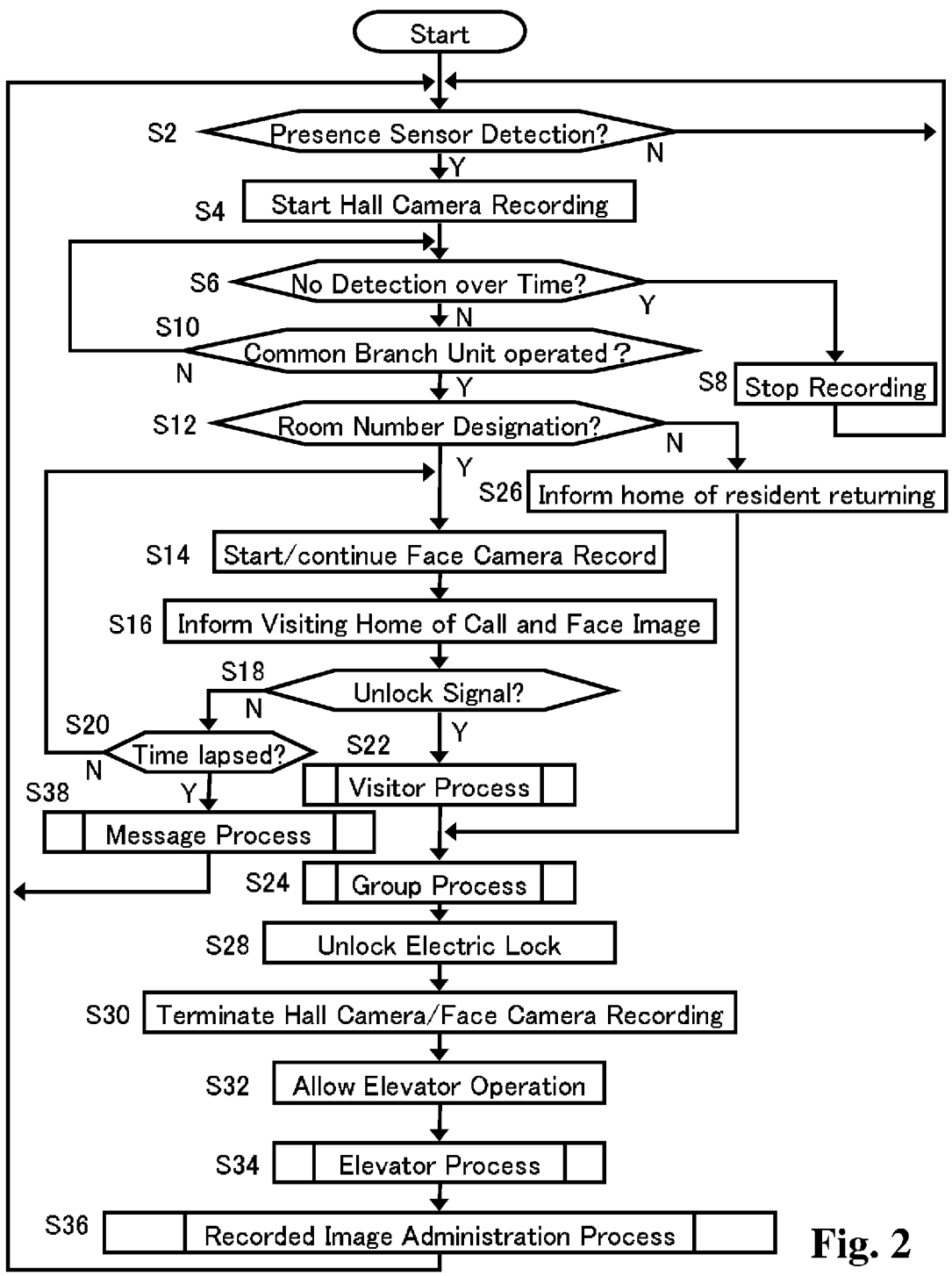
FIG. 2 is a flowchart showing the function carried out by common base unit of administrative room in FIG. 1.

FIG. 2 is a flowchart showing the function carried out by common base unit 12 of administrative room 10 in FIG. 1. Common base unit 12 is basically a computer, the flowchart in FIG. 2 showing the function of the computer. The flowchart starts when the collective housing such as a condominium is equipped with the monitoring system according to the embodiment of this invention. If the flow starts, it is checked in step S2 whether or not presence sensor 8 detects a presence of anyone in communal entrance hall 6. If nobody is detected, step S2 is repeated to wait for detection.

If it is confirmed in step S2 that presence sensor 8 detects a presence of someone in communal entrance hall 6, the flow goes to step S4 to direct starting the image recoding function by hall camera 18 and common recorder 16, the flow then advancing to step S6. In step S6 it is checked whether or not presence sensor has lost the detection of someone in communal entrance hall 6 and the resultant no detection condition lasts over a predetermined time period. If the no detection over time is detected in step S6, the flow goes to step S8 to stop the recording function by hall camera 18 and common recorder 16. The flow then goes back to step S2 to wait for a next detection of someone. On the other hand, if it is determined in step S6 that presence sensor 8 continues to detect someone or no detection condition lasts within the predetermined time period, the flow goes to step S10 to check whether or not common branch unit 14 is operated at operating portion 20. If no operation of the operating portion 20 is detected in step S10, the flow goes back to step S6 to repeat steps S6 and S10 for waiting for the expected operation of common branch unit 14 unless the no detection period comes to last over a predetermined time period.

If operation of the operating portion 20 of common branch unit 14 is detected in step S10, the flow goes to step S12 to check whether or not the operation is to make a call for first home 30 or the like to visit by designating the room number thereof. If the room number designation is confirmed in step 12, the flow goes to step S14 to start or continue the record of face image from face camera 22. Further in step S16, the intercom call signal and the face image of the visitor captured by face camera 22 is transmitted to local base unit 32 of first hoe 30 to be visited, the flow the going to step S18.

In step S18, it is checked whether or not the unlock signal is sent back in response to the transmission of the call signal and the face image. In the case of no response with the unlock signal, the flow goes to step S20 to check whether or not a predetermined time lapsed after the transmission of the call signal. If the time has not lapsed, the flow goes from step S20 back to step S14 to repeat the loop from steps S14 to S20 unless the unlock signal comes within the predetermined time. On the other hand, if the unlock signal is determined in step S18, the flow goes to step S22 to execute visitor process including record and announce, the flow then goes to step S24. The details of the visitor process in step S22 will be explained later.

On the other hand, if it is determined in step S12 that the operation is not to designating a room number, it means that the operation is not made by a visitor to make an intercom call for first home 30 or the like, but by a homecoming resident inserting the unlock card, or inputting the password, or making the biometrics authentication for directly unlocking electric lock 24 by himself/herself, the flow then going to step S26. In step S26, local base unit 32 of the home to which the homecoming resident belongs is informed of the return of the resident. Thus, the function caused by step S26 serves as a right before notice of the return of outing one of a family to another one of the family staying home. In other words, the home-staying one of the family can expect that a call at local branch unit 49 will be made by the homecoming one of the family in a few minutes form the before notice caused at communal entrance hall 6. Thus, the home-staying one of the family can assume at ease that the call at local branch unit 49 is truly by the homecoming one of the family, since it is rare that an impostor or the like makes the call at local branch unit 49 under this situation. On the other hand, if the expectation of the call at local branch unit 49 has been disappointed for a long time after the notice caused at common branch unit 14, the home-staying one of the family can note and suspect that homecoming one of the family would get involved in some accident or crime getting in the way from communal entrance hall 6 to first home 30 or the like. In the case that the returning resident lives alone, the information caused by step S26 can be utilized to automatically turn on the illumination and/or air conditioner of the home. In any case, since step S26 directly leads to step S24, the recording of the image from face camera 22 caused by step S14 is not carried out.

In step 24, the group process for coping with the case that a group of persons are to successively pass through communal entrance hall 6, the group process including image recording and announcement in such a case. The details of the group process will be explained later. By way of step S24, the flow goes to step S28 to make a direction to unlock electric lock 24 in communal entrance hall 6. Further, in step S30, a direction is made to terminate the function of recording image in communal entrance hall 6 by means of hall camera 18 and also face camera 22 if functioning. In addition, in step S32, a direction is made to allow the operation relating to elevator 26, in which any person passing through communal entrance hall can open the door of elevator 26 and set a destination floor.

Next in step S34, elevator process is carried out, in which functions relating to the image recordation and the announcement in elevator 26 are carried out. The details of the elevator process in step S22 will be explained later. Further in step S36, the process of administration for the recorded image to keep privacy therein is carried out, the flow then going back to step S2 to repeat the loop of steps led by step S2. On the other hand, if it is determined in step S20 that the predetermined time lapsed with the unlock signal retuned in response to the transmission of the call signal, the flow goes to step S38 to carry out massage process, in which voice message of the visitor can be left, the flow the going back to step 2. In the message process, it is announced that the face recording has begun and the voice message is recommended to be added to the face image. The details of the message process in step S38 will be explained later.

Figure 3:
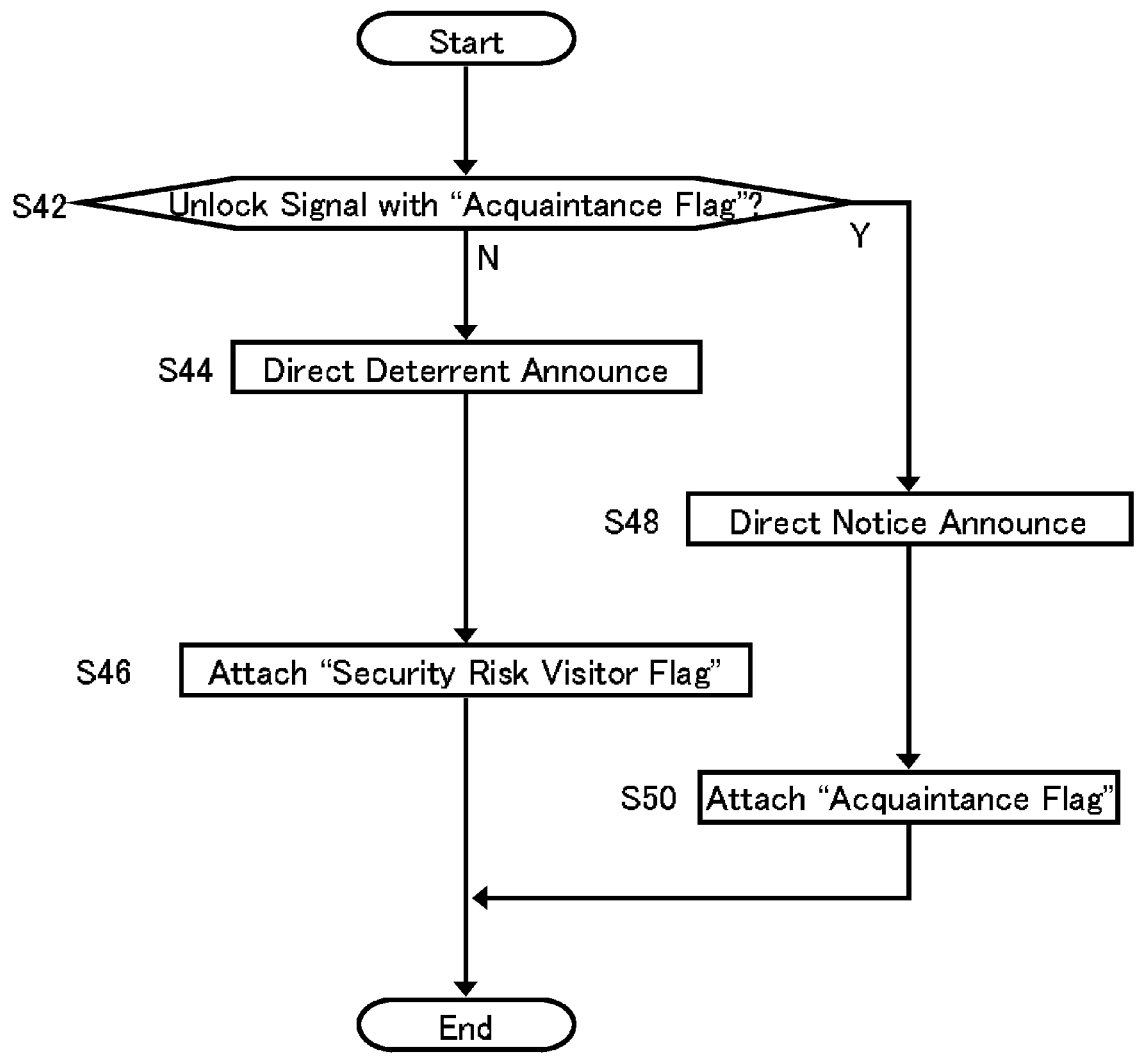
FIG. 3 is a flowchart showing the detailed function of the visitor process in step S22 in FIG. 2.

FIG. 3 is a flowchart showing the detailed function of the visitor process in step S22 in FIG. 2. If the flowchart starts, it is checked in step S42 whether or not the unlock signal comes with "acquaintance flag" accompanying. If not, the flow goes to step S44 to have common branch unit 14 make the deterrent announce such as "Please note your face has been just recorded. Thank you." by means of speaker 38 The flow then goes to step S46 to direct common recorder 16 to attach "security risk visitor flag" to the recorded face, the flow then going to the end. Such an attachment of "security risk visitor flag" is advantageously utilized in case of inspection afterward.

On the contrary, if it is determined in step S42 that the unlock signal comes with "acquaintance flag" accompanying, the flow goes to step S48 to have common branch unit 14 make the notice announcement such as "Please note that faces of all visitors to this condominium are recorded upon every intercom conversation for the purpose of keeping safety of visitors and residents. Your consideration has bee greatly appreciated." by means of speaker 38. The flow then goes to step S50 to direct common recorder 16 to attach "acquaintance flag" to the recorded face, the flow then going to the end. As has been mentioned, the difference in the tone of announcement depending on the presence or absence of the acquaintance flag corresponds to the difference in the object of the announcement. On the other hand, the difference in the flag to be attached to the face image depending on the presence or absence of the acquaintance flag is advantageous in searching into face images afterward for examination of evidence in case of a crime for example. Further, depending on the acquaintance flag attached to the face image, the face images recorded in common recorder 16 are kept in such a security condition that anyone cannot access the face image unless authorized by a person relating to the visit of the acquaintance. This will be further discussed later.

Figure 4:
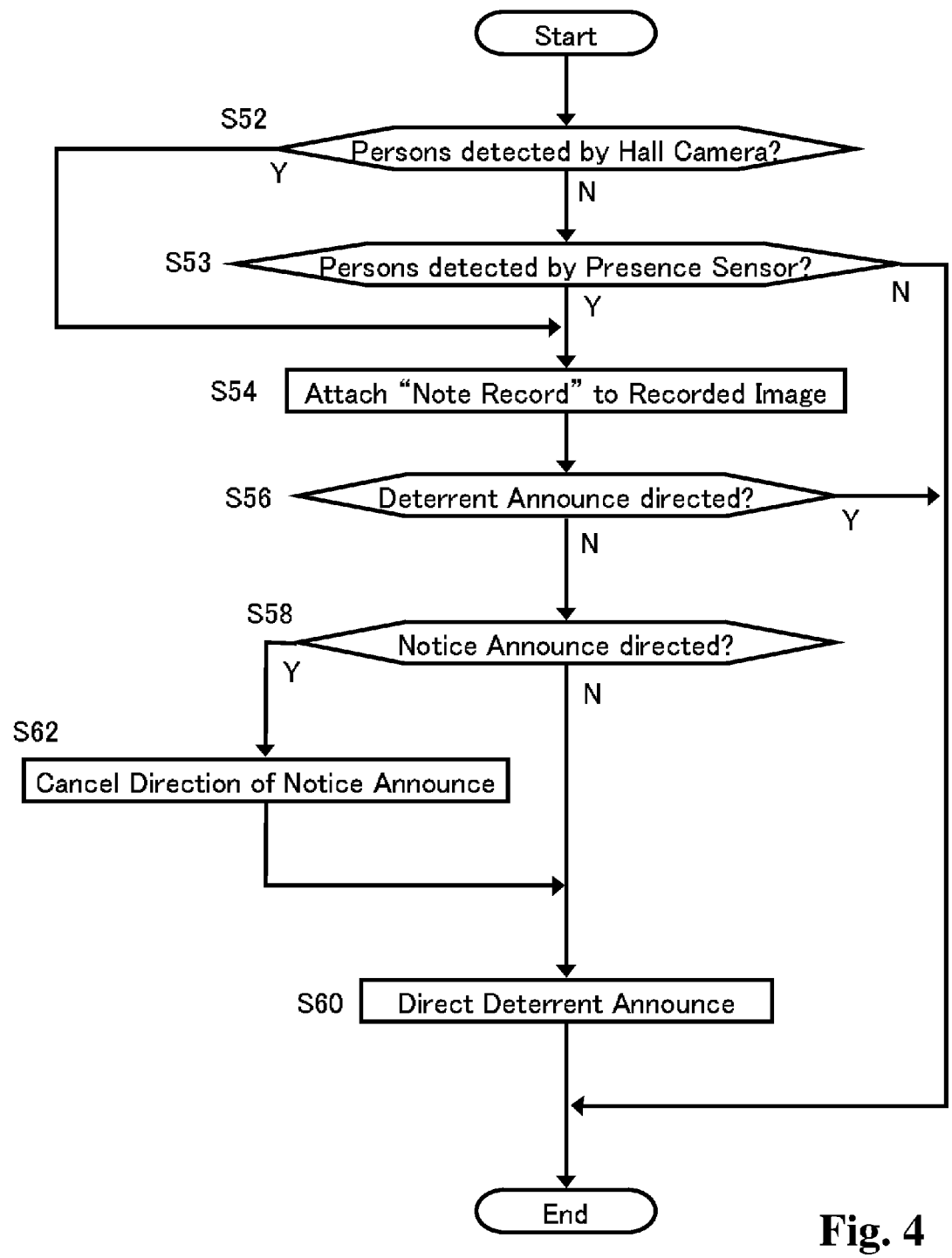
FIG. 4 is a flowchart showing the detailed function of the group process in step S24 in FIG. 2.

FIG. 4 is a flowchart showing the detailed function of the group process in step S24 in FIG. 2. If the flowchart starts, it is checked in step S52 whether or not a group of persons are detected through the image processing of the output signal form hall camera 18. If not, the flow goes to step 53 to check whether or not a group of persons are detected by presence sensor 8. If a group of persons are detected in step S53 thorough presence sensor 8, the flow goes to step S54. Further, if a group of persons are detected in step S52 through hall camera 18, the flow also goes to step S54. In step S54, which is caused by the detection of a group of persons either through hall camera 18 or presence sensor 8, or through both, "note record" is attached to the recorded image for a later inspection.

Further in step S56, it is checked whether or not the "deterrent announcement" has been directed through step S44 of visitor process in FIG. 3. If not, the flow goes to step S58 to check whether or not the "notice announcement" has been directed through step S48 of visitor process in FIG. 3. If not, the flow goes to step S60 to have common branch unit 14 make the "deterrent announce" by means of speaker 38, the flow then going to the end. On the other hand, if it is detected in step S58 that the "notice announcement" has been directed through step S48 of visitor process in FIG. 3, the flow goes to step S62 to cancel the direction of the "notice announcement" to go to step S60. Thus, the "notice announcement" is replaced by the "deterrent announcement" by means of steps S62 and S60 in this case.

As is clear form the above explanation, even if the "notice announcement" is directed in response to the "acquaintance flag" at the stage of visitor process in step S22, the "notice announcement" is changed up to the "deterrent announcement" at the succeeding stage of group process in step S24 in response to the detection of a group of persons. This is to cope with a case of a person with bad intention following an acquaintance visitor duly passing through communal entrance hall 6. On the other hand, if it is detected in step S56 that the "deterrent announcement" has been directed through visitor process in step S22 in FIG. 2, the flow directly goes from step S56 to the end since there is no need of directing the "deterrent announcement" again or changing the direction. Further, if it is concluded at the stage of step S53 that a group of persons are not detected through hall camera 18 or presence sensor 8, the flow directly goes to the end since there is no function needed any more in the group process.

Figure 5:
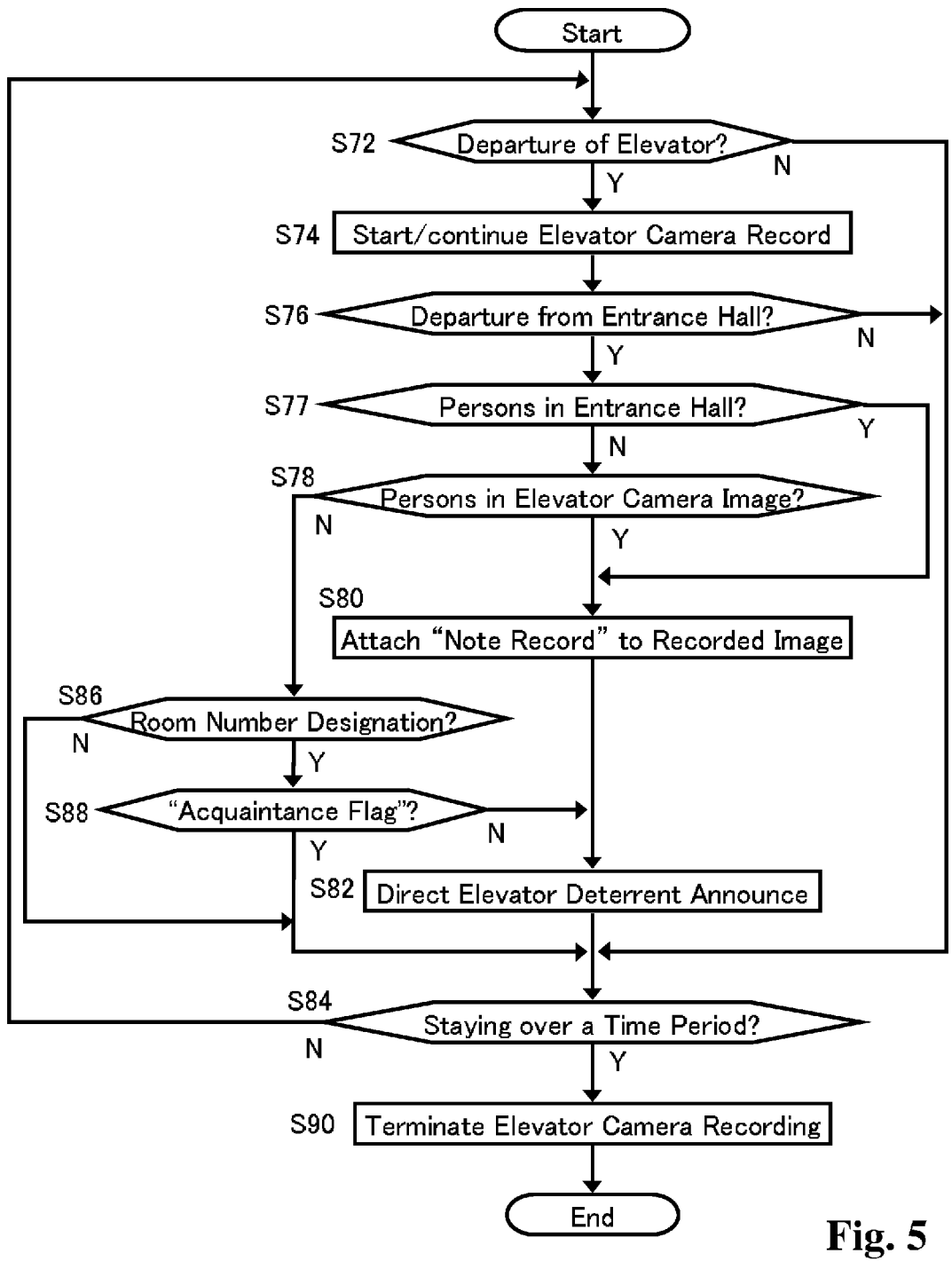
FIG. 5 is a flowchart showing the detailed function of the elevator process in step S34 in FIG. 2.

FIG. 5 is a flowchart showing the detailed function of the elevator process in step S34 in FIG. 2. If the flowchart starts, it is checked in step S72 whether or not elevator departs from some floor. If the departure is detected, the flow goes to step S74 to start or continue the record of image from elevator camera 40. Further in step S76, it is checked in step S72 whether or not elevator departs from the floor of entrance hall 6. This corresponds to a check whether or not the person(S) has gotten on elevator 26 directly by way of the passage through communal entrance hall 6. In the case of departure from the entrance hall floor, the flow goes to step S77 to check whether or not a group of persons were detected through the image processing of the output signal form hall camera 18 or through presence sensor 8.

If it is not determined in step S77 that a group of persons were detected at communal entrance hall 6, the flow goes to step S78 to check whether or not a group of persons are now detected in elevator 26 through the image processing of the output signal form elevator camera 40. If a group of persons are detected in step S78, the flow goes to step S80 to have common recorder 16 attach "note record" to the image from elevator camera 40 for a later inspection. Further, if it is confirmed in step S77 that a group of persons were detected in communal entrance hall 6, the flow also goes to step S80 for the attachment of the "note record" to the elevator image for a later inspection. The flow the goes to step S82 to have elevator 26 make the deterrent announcement by means of speaker 42.

On the other hand, if a group of persons are not detected in step S78 through the image of elevator camera 40, the flow goes to step S86 to check whether or not the operation at common branch unit 14, which was assumed to be done by a person in elevator 26, was to make a call for first home 30 or the like to visit by designating the room number thereof. If the room number designating operation is confirmed in step 86, the flow goes to step S88 to check whether or not the unlock signal allowing the person to get on elevator 26 came with "acquaintance flag" accompanying. If not, the flow goes to step S82 to have elevator 26 make the deterrent announce. Thus, the deterrent announcement to a visitor with possibly a bad intention entering without "acquaintance flag" is repeated in elevator 26 in addition to that in communal entrance hall 6. Such a repetition of the deterrent announcement is expected to more effectively prevent the person from going ahead with the bad intention by informing the visitor of the image recordation in elevator 26 in addition to communal entrance hall 6.

On the contrary, if it is determined in step S86 that the operation at common branch unit 14, which was assumed to be done by a person in elevator 26, was not to designate room number, the person in elevator 26 alone is considered to be a resident who can unlock by himself/herself. In the case of step S88, if it is determined that the unlock signal came with "acquaintance flag", the person in elevator alone is considered to be an acquaintance visitor. Thus, the person in elevator 26 in those cases is assumed to have well known of the image recordation and correctly understood its meaning. Accordingly, the flow goes from step S86 or step S88 to step S84 in those cases with troublesome announcement omitted. By the way, if the departure of elevator 26 is not detected in step S72, or if it is confirmed in step S76 that elevator 26 departs from a floor other than the floor of entrance hall 6, the flow directly goes to step S84.

In step S84, it is checked whether or not elevator 26 keeps staying in the same floor over a predetermined time period. If not, the flow goes back to step S72 to repeat steps S72 to S88 unless elevator 26 staying in the same floor over a predetermined time period. On the other hand, if it is detected in step S84 that elevator 26 keeps staying in the same floor over a predetermined time period, the flow goes to step S90 to make a direction to terminate the function of recording image in elevator 26 by means of elevator camera 40, the flow then going to the end.

Figure 6:
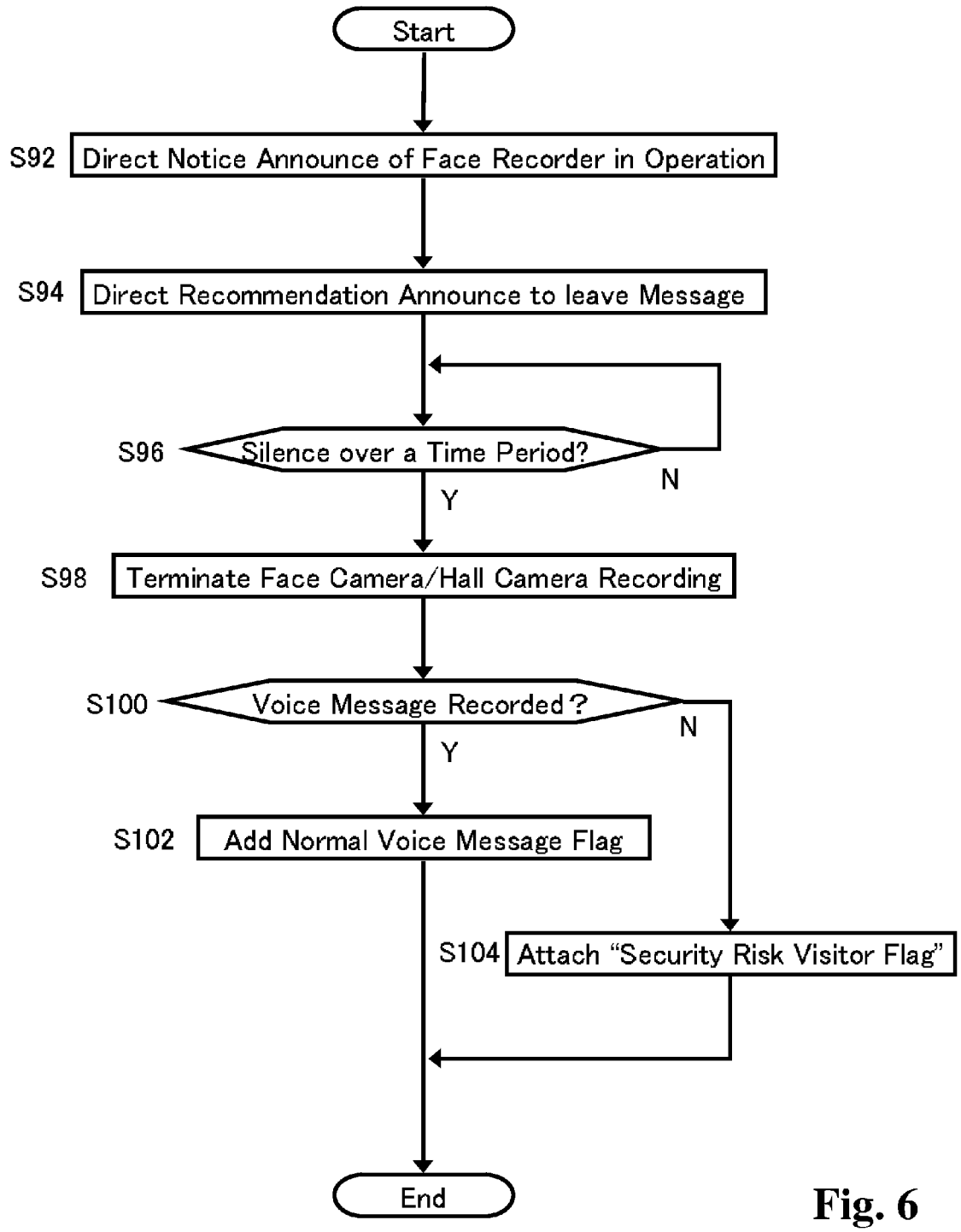
FIG. 6 is a flowchart showing the detailed function of the message process in step S38 in FIG. 2.

FIG. 6 is a flowchart showing the detailed function of the message process in step S38 in FIG. 2. If the flowchart starts, common branch unit 14 is directed to make a notice announcement by means of speaker 38 to inform the visitor of the face recorder has been in operation. Further, in step 94, common branch unit 14 is directed to make an additional announcement by means of speaker 38 to recommend the visitor to leave voice message in addition to the recorded face for transmitting best regard or reason of the visit. Next, step S96 is repeated to wait for such a situation that silence continues over a predetermined time period, which is expected after completion of a voice message or no response to the voice message recommendation. If the continued silence is detected in step S96, the flow goes to step S98 to terminate the face camera recording and the hall camera recordation, the flow then going to step S100. This is because that the visitor has gone, where recoding by face camera 22 or hall camera 18 is not necessary any more.

In step S100, it is checked whether or not voice message has been recorded in response the recommendation in step s94. If any, the flow goes from step S100 to step S102 to add normal massage flag to the recorded face image, the flow then going to the end. On the contrary, if it is detected in step S100 that no voice massage recorded, the flow goes to step S104 to attach "security risk visitor flag" to the recorded face image, the flow then going to the end also in this case. This is because that a person of goodwill is expected to leave some voice message to avoid impoliteness of silence if he/she is informed of the recoding of his/her face which will be played back afterward. In other words, a visitor who has gone without a word for all the information of face recording is assumed be a person with bad intention such as a sneak thief coming to confirm absence from a target home in advance. The "security risk visitor flag" attached in step S104 can be also advantageously utilized in case of inspection afterward.

Figure 7:
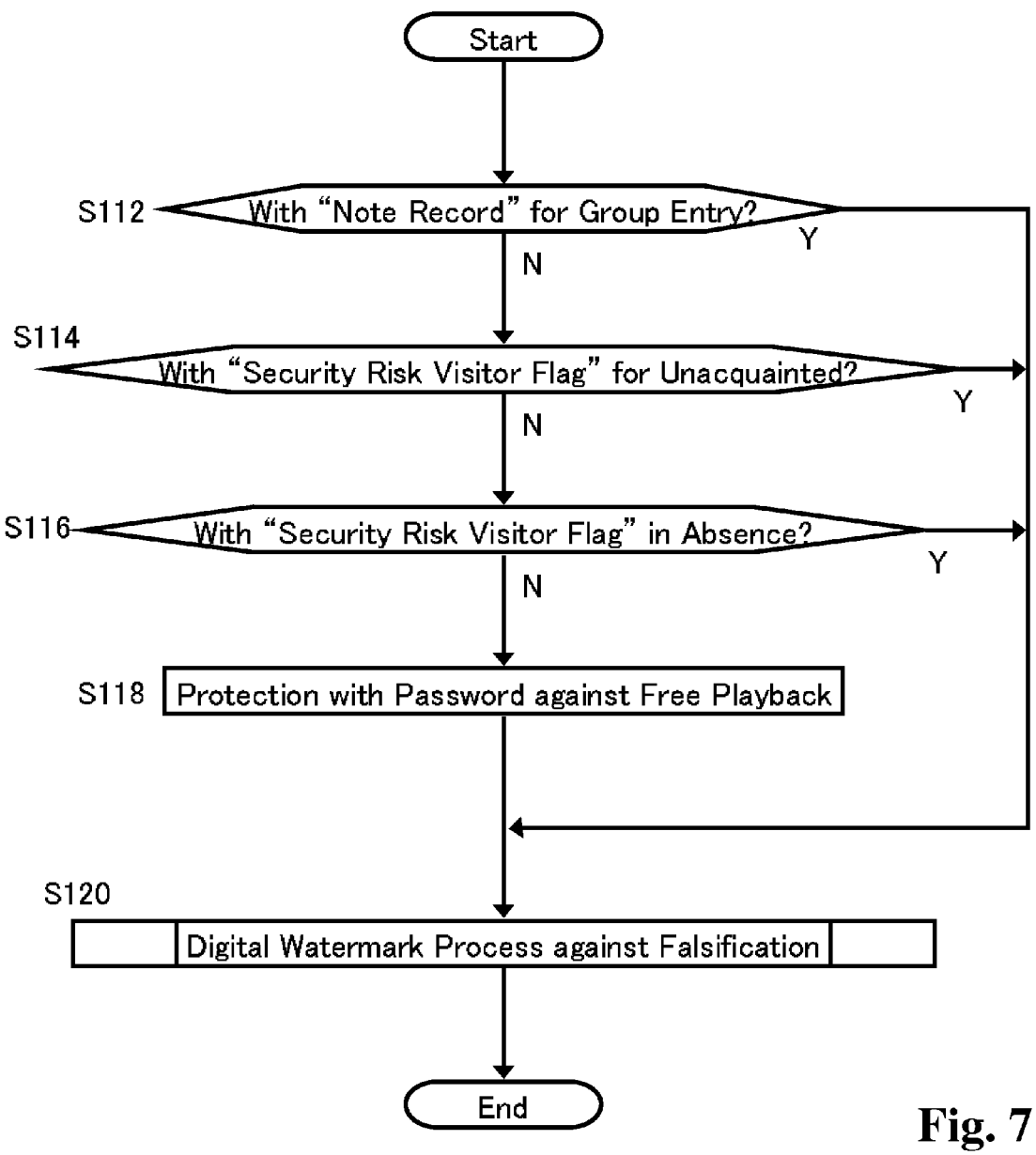
FIG. 7 is a flowchart showing the detailed function of the recorded image administration process in step S36 in FIG. 2.

FIG. 7 is a flowchart showing the detailed function of the recorded image administration process in step S36 in FIG. 2. If the flowchart starts, it is checked in step S112 whether or not the image is recorded with "note record" attached in the case of the group entry through communal entrance hall 6. If not, the flow advances to step S114 to check whether or not the image is recorded with "security risk visitor flag" caused by the unlock signal without "acquaintance flag." If not, the flow further advances to step S116 to check whether or not the image is recorded with "security risk visitor flag" caused by silence of a visitor in the case of absence from home. If not, the flow goes to step S118 to implement a measure of privacy protection with password to the recorded image, the flow then going to step S120. A recorded image not falling into any of queries in step S112 to S116 is assumed to be of an acquaintance visitor for which the privacy has to be carefully kept. Step S118, accordingly, implements the protection with password to such a recorded image for preventing the image from being freely played back without permission.

On the contrary, as to a recorded image falling into one of queries in step S112 to S116, it is considered that the necessity of inspection for security prevails over privacy protection. Thus, the flow goes directly to step S120 form any of steps S112 to S116. In other word, anyone can immediately playback the recorded image without password upon necessity of inspection. In step S120, the recorded image is processed to combined with digital watermark against falsification, the flow then going to the end.

The various features and advantages are not limited to be enjoyed by the embodiment above, but are widely applicable to other embodiments. For example, the embodiment in FIG. 1 is shown in a simplified manner in which only one elevator 26 is included with single approach through ways 4, 28 and 44 formed between communal entrance hall 6 and shared corridor 48. However, the various features and advantages are applicable in an embodiment with multiple approaches including a plurality of elevators. In other words, the flowchart in FIG. 2 is explained as a series of steps on the basis of the simplified embodiment in FIG. 1, in which the loop of steps S2 to S36 cannot be repeated unless every step has been completed one by one. For example, the second execution of step 2 for presence detection in communal entrance hall 6 cannot occur unless the first execution of the elevator process in step S34 has been completed. This is because that there is no approach for a visitor to go ahead from communal entrance hall 6 into shared corridor 48 unless elevator 26 comes back to the floor of communal entrance hall 6 with the elevator process in step S34 completed, which makes it unnecessary to check in step S2 the presence in communal entrance hall 6 unless elevator process in step S34 has been completed. In the case of the embodiment with multiple approaches including a plurality of elevators, on the contrary, the functions relating to communal entrance hall 6 and the functions relating to elevator 26 are not carried out in series, but are carried out in parallel. In this case, the elevator process, the detailed flowchart of which is shown in FIG. 5 is not located at step S34, but is arranged to be carried out independently from the flow in FIG. 2 in response to the operation at one of the elevators.

According to another example of other embodiments, the deterrent against a visitor with bad intention or the notice to a visitor with goodwill is carried out by means of visual means in place of or in addition to the audio means as in the above embodiment. In other words, common branch unit 14 and elevator 26 is arranged to further include an indicator or a monitor for displaying the deterrent message or notice message. Especially, in the case of common branch unit 14 having such an indicator or a monitor, the visitor is capable of being informed of the visual deterrent or notice message during the intercom conversation.

What is claimed is:

1. A monitoring system of a person coming to an entrance of a building comprising:
    a camera arranged to capture an image of the entrance including the person and a plurality persons including the person if any;
    a recorder arranged to record the image captured by the camera;
    a generator arranged to generate an announcement for informing the person of the fact that the capture and the recoding of the image of the person is done;
    an unlock system of the entrance arranged to identify whether the person coming to the entrance is a resident of the building or a visitor to the building; and
    a detector arranged to detect whether the person alone is to enter the entrance or the plurality of persons including the person is to enter the entrance at once,
    wherein the generator is arranged to be controlled by the unlock system not to generate the announcement with the unlock system identifying the person as the resident of the building, but to generate the announcement with the unlock system identifying the person as the visitor to the building, and
    wherein the generator is arranged to be controlled by the detector to change the contents of announcement depending on whether the detector detects the person alone as an acquaintance visitor or an unacquainted visitor to enter the entrance or the plurality of persons including the person to enter the entrance at once.

2. The monitoring system according to claim 1, wherein the unlock system includes an intercom arranged to receive an unlock direction from inside of the building in response to a call from the visitor, the unlock system identifying the person as the acquaintance visitor in response to the unlock direction accompanied with an acquaintance confirmation made inside the building.

3. The monitoring system according to claim 1, further comprising an identifier arranged to identify the person, wherein the generator is arranged to repeat the announcement at deferent places in the building, the repetition being omitted with the identifier identifying the person as one of a resident and an acquaintance visitor.

4. The monitoring system according to claim 1, further comprising an administrator arranged to add additional information to the image recoded by the recorder for a later inspection.

5. A monitoring system of a person coming to an entrance of a building comprising:
    a camera arranged to capture an image of the entrance including the person and a plurality of persons including the person if any;
    a recorder arranged to record the image captured by the camera;
    a generator arranged to generate an announcement for informing the person of the fact that the capture and the recording of the image of the person is done;
    an administrator arranged to add additional information to the image recorded by the recorder for a later inspection, and
    a detector arranged to detect whether the person alone is to enter the entrance or the plurality of persons including the person is to enter the entrance at once,
    wherein the administrator is arranged to be controlled by the detector to change the contents of the additional information and the contents of announcement depending on whether the detector detects the person as a resident or an acquaintance visitor or an unacquainted visitor alone to enter the entrance or the plurality of persons including the person to enter the entrance at once.

6. The monitoring system according to claim 5, further comprising an unlock system of the entrance, wherein the administrator is arranged to be controlled by the unlock system to change the additional information to be added to the recorded image.

7. The monitoring system according to claim 6, wherein the recorder is arranged to withhold the recoding function with the unlock system identifying the person as a resident in the building whereas the recorder carries out the recording function with the unlock system identifying the person as a visitor.

8. The monitoring system according to claim 5, wherein the recorder is arranged to change the accessibility to the recorded image in response to the additional information added by the administrator indicative of type of visitors relating to privacy protection level.

9. The monitoring system according to claim 5, further comprising a voice message system, wherein the administrator is arranged to be controlled by the voice massage system to change the additional information to be added to the recorded image depending on whether or not a voice message is left.

10. A monitoring system of a person coming to an entrance of a building comprising:
    a camera arranged to capture an image of the person;
    a recorder arranged to record the image captured by the camera;
    a generator arranged to generate an announcement for informing the person of the fact that the capture and the recording of the image of the person is done;
    an unlock system of the entrance arranged to identify whether the person coming to the entrance is a resident of the building or a visitor to the building; and
    a detector arranged to detect a plurality of persons including the person to enter the entrance,
    wherein the recorder is arranged not to record the image and generate the announcement of the person with the unlock system identifying the person coming to the entrance as the resident of the building, but to record the image of the person and the detector to change the contents of announcement with the unlock system identifying the person as the visitor, an acquaintance visitor, or an unacquainted visitor or plurality of persons to the building.

11. The monitoring system according to claim 10, wherein the unlock system includes an intercom arranged to receive an unlock direction from inside of the building in response to a call from the visitor and a resident unlock operating portion, the unlock system identifying the person as the resident with the resident unlock operating portion duly operated whereas the unlock system identifying the person as the visitor with a call through the intercom made.

12. The monitoring system according to claim 1, wherein the unlock system includes an intercom arranged to receive an unlock direction from inside of the building in response to a call from the visitor and a resident unlock operating portion, the unlock system identifying the person as the resident with the resident unlock operating portion duly operated whereas the unlock system identifying the person as the visitor with a call through the intercom made.

\* \* \* \* \*